Jan. 2, 1968  R. ROMANINI  3,361,485
TRACTOR-TRAILER BRAKE

Filed Feb. 16, 1966  2 Sheets-Sheet 2

United States Patent Office 3,361,485
Patented Jan. 2, 1968

3,361,485
TRACTOR-TRAILER BRAKE
Romeo Romanini, Turin, Italy, assignor to Lancia & C. Fabbrica Automobili-Torino S.p.A., Turin, Italy
Filed Feb. 16, 1966, Ser. No. 527,912
Claims priority, application Italy, Feb. 16, 1965, 3,817/65
5 Claims. (Cl. 303—31)

This invention relates to controls for operating a hydraulic brake on a trailer trailed by a tractor provided with a hydraulic brake mechanism of which the master cylinder is operatively connected with the brake pedal.

A direct control is known, in which the master cylinder on the tractor is connected with the hydraulic cylinder on the trailer by pipes provided with valved couplings.

This direct control is objectionable in that the stroke of the brake pedal increases when the hydraulic brake mechanism on the trailer is connected with the brake mechanism on the tractor, whereby the braking action is reduced to the point of making braking ineffective.

An overrunning type of trailer brake is further known for a tractor and trailer provided with distinct hydraulic brake mechanisms. By this control the brake on the trailer is activated by exploiting the bump by the trailer on the tractor on braking of the latter.

The overrunning type of trailer brake is objectionable in that the trailer is braked even when this is not desired, such as in reverse or all such cases in which engine braking of the tractor is effected.

An object of this invention is to provide in a tractor and trailer each provided with a hydraulic brake mechanism for activating the trailer brake only when the tractor brake is applied by the driver, without any appreciable variation in the brake pedal stroke whether the trailer is coupled with or uncoupled from the tractor.

A further object of this invention is to provide a quick braking action on the trailer proportional to the braking action applied by the driver to the tractor.

With the above and further objects in view, which will be understood from the folowing description, this invention provides a pneumatic servo-control for operating the hydraulic brakes on the trailer simultaneously with operation of the hydraulic brakes on the tractor driven by an internal combustion engine having a suction manifold, the tractor being provided with a pedal operated master cylinder for the brakes which is hydraulically connected to the wheel brake cylinders on the tractor, the trailer being provided with a hydraulic cylinder, hydraulically connected to the wheel brake cylinders on the trailer, wherein the control comprises a pneumatic cylinder arranged on the trailer and subdivided into an air-tight first and second chamber, by a movable partition operatively connected with a piston of the hydraulic cylinder on the trailer, the second chamber being connected with the suction manifold, a three-way distributor valve situated on the tractor, and formed with a first port connected with the first chamber in the pneumatic cylinder, a second port connected to the atmosphere and a third port connected to the suction manifold, a valve member movable in the said distributor valve which is kept by resilient means in an inoperative position in which the valve member connects the first port with the third port and closes the second port, a hydraulic cylinder the piston of which is operatively connected with the valve member and is hydraulically operated by the master cylinder on the tractor for moving the valve member against the action of the resilient means from its inoperative to an operative position in which the valve member interconnects the first and second ports, closes the third port and opens the second port.

Further characteristic features and advantages of this invention will be understood from the appended detailed description referring to the accompanying drawings given by way of a non-limiting example, wherein:

FIGURE 1 diagrammatically shows the hydraulic brake mechanism on a tractor and the hydraulic brake mechanism on a trailer interconnected by a pneumatic servo-control according to this invention;

Figure 1:
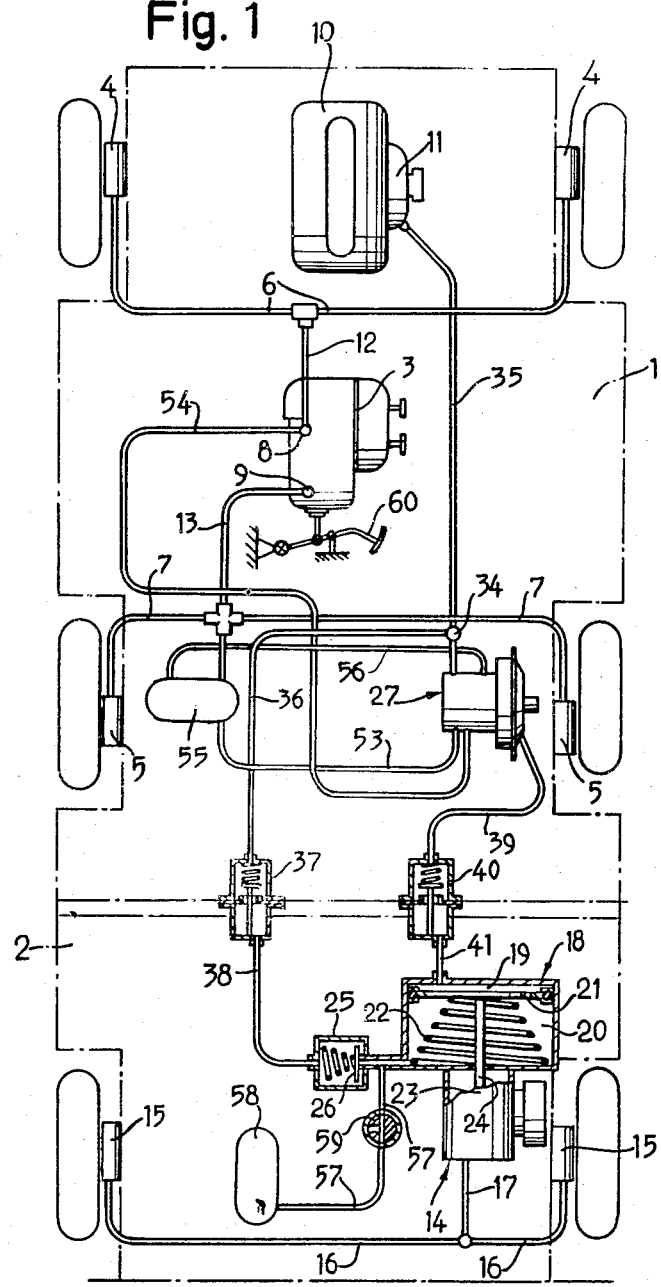

In FIGURE 1 the outer contour of a tractor 1 and its trailer 2 is denoted in plan view by dash lines.

An internal combustion engine 10 on the tractor 1 is provided with an induction manifold 11.

The hydraulic brake mechanism on the tractor 1 comprises a master cylinder 3 controlled by a pedal 60, two front wheel and two rear wheel brake cylinders 4, 5, respectively, of known type.

The master cylinder 3 has two outlets 8, 9.

The wheel brake cylinders 4 are interconnected by a pipe 6.

The outlet 8 is connected with an intermediate region of the pipe 6 by a pipe 12.

The rear wheel brake cylinders 5 are interconnected by a pipe 7.

The output 9 on the master cylinder 3 is connected to an intermediate region of the pipe 7 by a pipe 13.

The hydraulic brake mechanism on the trailer comprises a master cylinder 14 and two wheel brake cylinders 15 of known type.

The wheel brake cylinders 15 are interconnected by a pipe 16.

The master cylinder 14 is connected to an intermediate region of the pipe 16 by a pipe 17.

According to this invention a pneumatic cylinder 18 is arranged on the trailer 2 and is subdivided into a first and second chamber 19, 20, respectively, by a piston 21.

The piston 21 is operatively connected with the piston 23 in the master cylinder 14 by a stem 24.

The second chamber 20 is connected with a one-way valve 25 having a valve member 26 opening to the outside relatively the chamber 20.

A distributer valve 27 is arranged on the trailer and comprises a pneumatic and a hydraulic section.

Figure 2:
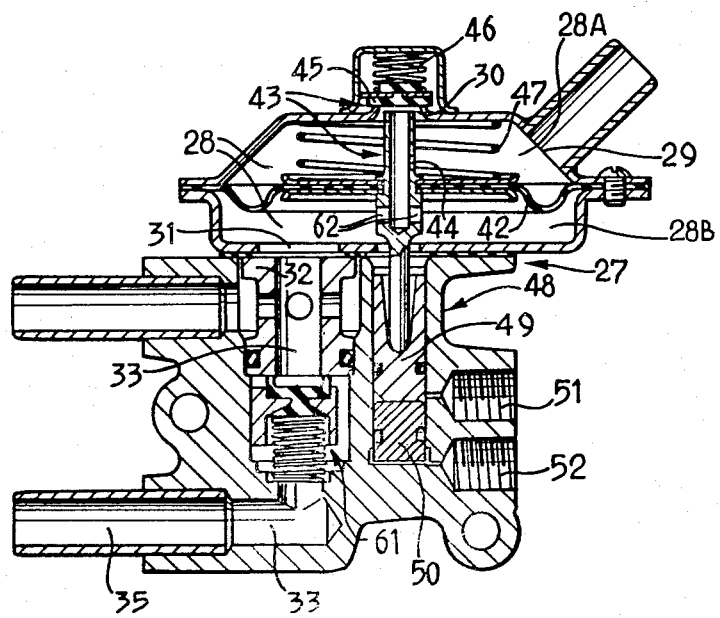
FIGURE 2 is an axial sectional view of the three-way distributor valve on the servo-control.

The pneumatic section of the valve 27 comprises a chamber 28 subdivided by a resilient diaphragm 42 (FIG. 2) into two portions 28A and 28B.

The chamber 28 is provided with a first, second and third ports 29, 30, 31, respectively.

The first port 29 in the chamber 28 connects the portion 28A with the first chamber 19 in the pneumatic cylinder 18 through a pipe 39, a valved coupling 40 and a pipe 41.

The second port 30 in the chamber 28 vents the portion 28A.

The third port 31 in the chamber 28 connects the portion 28B with the induction manifold 11 of the motor 10 through a conduit 33 formed in the body of the valve 27 and a pipe 35.

A pipe 36 is branched at 34 from the pipe 35 and connects through a further valved coupling 37 and a pipe 38 to the connection 25 with the pipe 35 and induction manifold 11.

A valve 43 is arranged in the chamber 28, comprising a rubber valve member 45 and a stem 44. The valve member 45 is urged by a spring 46 against a seat in the port 30 and is lifted therefrom by the end portion of the stem 44 which sealingly extends through the diaphragm 42.

The stem 44 is axially bored and is formed with radial ports 62 opening into the portion 28B.

A spring 47 pre-stressed between the diaphragm 42 and a wall of the portion 28A tends to hold the bored end of the stem 44 removed from the valve member 45, so that the chambers 28A, 28B are interconnected through the radial ports and axial bore in the stem 44.

The hydraulic portion of the valve 27 comprises a hydraulic cylinder 48 provided with two coaxial pistons 49, 50 abutting each other by facing ends. The other end of the piston 50 bears on the bottom of the cylinder 48, the other end of the piston 49 bears on the other end of the stem 44.

The cylinder 48 is formed with two ports 51, 52 opening to the region at which the pistons 49, 48 abut each other and to the bottom of the cylinder 48, respectively.

The port 51 is connected with the port 8 in the master cylinder 3 by a pipe 56.

The port 52 is connected to an intermediate region of the pipe 7 by a pipe 53.

A one-way valve 61 is interposed in the conduit 33 and opens to the induction manifold 11.

A closed tank 55 is arranged on the tractor and connects with the conduit 33 through a pipe 56 branched from the conduit 33 intermediate the port 31 and valve 61.

The second chamber 20 in the pneumatic cylinder 18 is connected by a pipe 57 with a second closed tank 58 on the trailer.

During running of the engine 10 vacuum is applied to the tanks 55 and 58.

Figure 3:
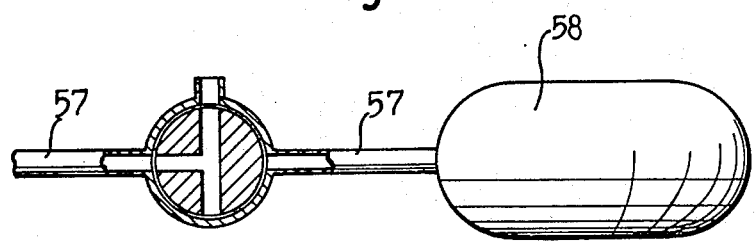
FIGURE 3 is a detail view of FIGURE 1 showing a threeway cock on the trailer in an operative position other than shown in FIGURE 1.

A three-way cock 59 is interposed in the pipe 57 and is movable by hand to two positions, in one of which, shown in FIGURE 1, the cock establishes communication between the tank 58 and second chamber 20, and in the other position shown in FIGURE 3 it cuts off the tank 58 and vents the second chamber to the outside.

When the driver partly depresses the brake pedal 60, the master cylinder 3 delivers pressure oil to the wheel brake cylinders 4 and 5 which effect braking of the tractor.

At the same time the master cylinder 3 delivers through pipes 13, 53 and 54 pressure oil to the hydraulic cylinder 48, the piston 49 of which is moved and displaces the stem 44 towards the valve member 45 against the action of the spring 47 and resilient diaphragm 42. The piston 50 is left inoperative by effect of the same pressure being applied to its two opposite faces.

The bored end of the stem 44 bears on the valve member 45 intercepting communication between the portions 28A and 28B of the chamber 28 and moves at the same time the valve member 45 against the action of the spring 46 thereby connecting the portion 28A of the chamber 28 to the atmosphere.

A pressure is thereby built up in the portion 28A which is higher than the pressure in the portion 28B, so that the stem 44 tends to be returned together with the valve member 45.

The return movement of the stem 44 causes the piston 49 to recede so that the pressure of oil between pistons 49, 50 rises and intensifies braking of the tractor.

After return of the piston 49 the valve member 45 cuts off the port 30 from the atmosphere and further bears on the bored end of the stem 44 intercepting communication between the port 29 and port 31 and maintains a higher pressure in the portion 28A than in the portion 28B.

The pressure prevailing in the portion 28A is transmitted to the chamber 19 in the pneumatic cylinder 18, the pressure in the second chamber 20 of the cylinder 18 being the same as in the portion 28B.

By effect of the differential pressure in the chambers 19 and 20 the piston 21 is moved and operates the master cylinder 14 thereby braking the trailer.

A further action on the brake pedal 60 effects repetition of the just described steps, thereby enhancing the braking action on the tractor 1 and trailer 2.

On release of the brake pedal 20 the resilient reaction of the diaphragm 42 and spring 43 withdraws the stem 44 which is removed from the valve member 45, whereby the portion 28A of the chamber 28 is connected with the portion 28B, the port 30 being closed by the valve member 45.

Consequently, the same vacuum is established in the portions 28A, 28B as well as in the chambers 19, 20 of the pneumatic cylinder 18, whereby the piston 21 is restored by spring 22 to its initial position and the master cylinder 14 is deactivated.

Damage to any of pipes 13, 54 or 53 does not adversely affect braking of the trailer for, as previously explained, one at least of the pistons 49, 50 is moved in the cylinder 48 on depression of the brake pedal 60.

Breakage of any of the pipes 36, 38 or coupling 37 does not affect operation of the brake on the trailer, inasmuch as the valve 26 maintains in the chamber 20 the vacuum existing before breakage, the tank 58 making up for any vacuum loss in the said chamber.

Breakage of the coupling 40 for pipes 39, 41 connects the chamber 19 to the atmosphere, whereby the trailer is readily braked.

In order to uncouple the trailer 2 from the tractor 1 the couplings 37, 40 are opened.

Opening of the coupling 40 vents the chamber 19 to the atmosphere, and opening of the coupling 37 does not affect the vacuum prevailing in the chamber 20 thanks to the check by the valve 26.

The differential pressure in chambers 19, 20 results in a braking action on the trailer 2.

In order to release the brake on the trailer uncoupled from the tractor the three-way cock 59 is acted upon to cut off the tank 58 and vent the chamber 20 to the atmosphere, (FIGURE 3).

The tank 55 on the tractor acts as means for ready establishing of vacuum in the chamber 19 of the pneumatic cylinder 18, when on release of the brake pedal 60 the manifold 11 would not be capable of effecting the necessary quick emptying of the chamber 19.

What I claim is:

1. Vacuum servo-control for operating the hydraulic brakes on a trailer simultaneously with operation of the hydraulic brakes on the tractor driven by an internal combustion engine having a suction manifold, the tractor being provided with a pedal operated master cylinder for the brakes which is hydraulically connected to the wheel brake cylinders on the tractor, the trailer being provided with a hydraulic cylinder hydraulically connected to the wheel brake cylinders on the trailer, characterized by the fact that the control comprises a pneumatic cylinder situated on the trailer and subdivided into a first and second airtight chamber, respectively, by a movable wall operatively connected with a piston of the hydraulic cylinder on the trailer, the second chamber being connected with the suction manifold, a three-way distributer valve situated on the tractor and formed with a first port connected with the first chamber in the pneumatic cylinder, a second port connected to the atmosphere, and a third port conected to the suction manifold, a valve member movable in the said distributer valve held by resilient means in an inoperative position in which the valve member connects the first port with the third port and simultaneously closes the second port, a hydraulic cylinder, the pistons of which are operatively connected with the valve member and are hydraulically operated by the master cylinder on the tractor for moving the valve member against the action of the said resilient means from its inoperative to its operative position in which the valve member connects the first port with the second port, closes the third port and opens the second port.

2. Pneumatic servo-control as claimed in claim 1, characterized by the fact that a closed tank is derived on the connection between the third port of the distributer valve and the suction manifold and a one-way valve, opening towards said suction manifold being interposed in the said connection between the tank and the suction manifold.

3. Pneumatic servo-control as claimed in claim 1, characterized by the fact that the second chamber in the pneumatic cylinder connects with the suction manifold provided with a one-way valve opening towards the suction manifold.

4. Pneumatic servo-control as claimed in claim 1, characterized by the fact that the second chamber in the pneumatic cylinder is connected to a closed tank situated on the trailer.

5. Pneumatic servo-control as claimed in claim 4, characterized by the fact that a three-way cock is interposed on the connection between the second tank and the second chamber in the pneumatic cylinder, said cock comprising an opening communicating with the atmosphere and connectable to the second chamber of the pneumatic cylinder.

References Cited

UNITED STATES PATENTS 2,305,638   12/1942   Rockwell _____ 303—31 X
2,463,172   3/1949   Gunderson _____ 303—31

DUANE A. REGER, *Primary Examiner.*